(12) United States Patent
Sadahiro et al.

(10) Patent No.: US 9,188,435 B2
(45) Date of Patent: Nov. 17, 2015

(54) METHOD FOR GENERATING ERROR IMAGE AND PROGRAM FOR GENERATING ERROR IMAGE

(75) Inventors: Sinichi Sadahiro, Sapporo (JP); Kouzo Umeda, Sapporo (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 822 days.

(21) Appl. No.: 13/468,314

(22) Filed: May 10, 2012

(65) Prior Publication Data

US 2012/0290260 A1 Nov. 15, 2012

(30) Foreign Application Priority Data

May 11, 2011 (JP) ................. 2011-106082

(51) Int. Cl.
*G01B 3/22* (2006.01)
*G01B 21/04* (2006.01)

(52) U.S. Cl.
CPC ..................... *G01B 21/04* (2013.01)

(58) Field of Classification Search
None
See application file for complete search history.

(56) References Cited

U.S. PATENT DOCUMENTS 5,694,331 A    12/1997   Yamamoto et al.
5,966,140 A *  10/1999   Popovic et al. .............. 345/441

FOREIGN PATENT DOCUMENTS

| JP | 05-034145    | 2/1993 |
| JP | 2003-021510  | 1/2003 |
| JP | 2003-114121  | 4/2003 |
| JP | 2004-013672  | 1/2004 |
| JP | 2006-509194  | 3/2006 |
| JP | 2007-183239  | 7/2007 |
| WO | 2004/051179  | 6/2004 |

* cited by examiner

*Primary Examiner* — Aditya Bhat
(74) *Attorney, Agent, or Firm* — Rankin, Hill & Clark LLP

(57) ABSTRACT

A point group on a surface parametric space of free-form surface data corresponding to a measurement points is calculated as a first point group. Error data between each of measurement points and design points is calculated. The first point group is triangulated to generate first triangular facets and calculate a convex hull of the first point group. A second point group distributed in the calculated convex hull on the surface parametric space is set. Error data of the second point group is obtained from error data corresponding to the first point group. A point group including the first point group and the second point group is re-triangulated to generate a second triangular facets.

20 Claims, 6 Drawing Sheets

METHOD FOR GENERATING ERROR IMAGE AND PROGRAM FOR GENERATING ERROR IMAGE

CROSS-REFERENCE TO RELATED APPLICATIONS

This application is based upon and claims the benefit of priority from the prior Japanese Patent Application No. 2011-106082, filed on May 11, 2011, the entire contents of which are incorporated herein by reference.

FIELD

The present invention relates to a method for generating an error image and a program for generating an error image, the error image displaying an error between a measurement points obtained by measuring a measured surface of a measurement object by a measuring instrument and a design value of the measurement object.

BACKGROUND

Description of the Related Art

A method for evaluation of quality of a product manufactured according to design data of CAD or the like, that measures the product actually manufactured by a three-dimensional measuring instrument, a profile measuring instrument or the like, and compares measured data with design values to display an error between the two as an error map, is known (JP 2006-509194 W). In measurement of a free-form surface, when employing this kind of method to provide a user with an intuitive understanding of an overall tendency of the error in the free-form surface, it is sometimes desired to display a distribution of the error based on error data of measurement points three-dimensionally.

However, in this kind of method, the measurement points are discrete points, hence when a number of measurement points is few, an unnatural image not reflecting an actual profile sometimes gets generated.

The present invention was made in view of such points and has an object of providing a method for generating an error image and a program for generating an error image capable of generating a natural error image at high speed based on error data of the measurement points.

DETAILED DESCRIPTION

Figure 1:
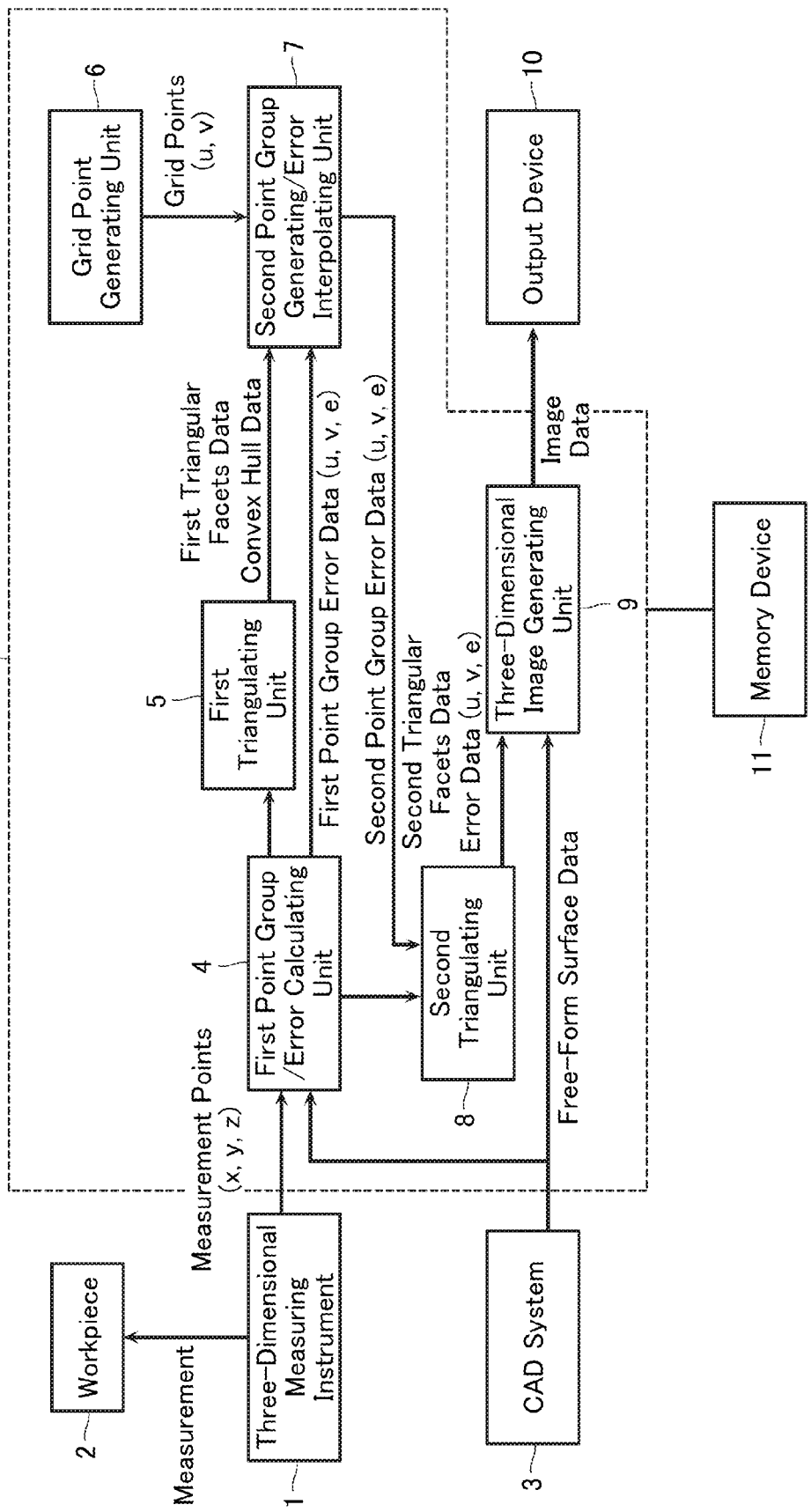
FIG. 1 is a block diagram showing an example of a configuration of a system for realizing a method for generating an error image according to a first embodiment of the present invention.

A method for generating an error image according to the present invention in which an arithmetic processing unit is inputted with a measurement points obtained by measuring a measured surface of a measurement object by a measuring instrument and free-form surface data which is design data of the measurement object, and in which the arithmetic processing unit calculates error data between the measurement points and the free-form surface data and, corresponding the error data to the measurement points, outputs the error data to an output device, comprises: calculating a point group on a surface parametric space of the free-form surface data corresponding to the measurement points, as a first point group; calculating error data between each of measurement points and design points on the free-form surface data corresponding to the measurement points; triangulating the first point group to generate first triangular facets and calculate a convex hull of the first point group; setting a second point group distributed in the calculated convex hull on the surface parametric space; obtaining error data of each of points of the second point group by interpolation calculation from error data corresponding to the first point group which is a vertex of the first triangular facets in which each of the respective points of the second point group is included; re-triangulating a point group including the first point group and the second point group to generate second triangular facets; and outputting to the output device the second triangular facets and error data of a vertex of the second triangular facets. Such a method makes it possible to generate a natural error image even if a number of measurement points is few. Furthermore, error between measurement points can be interpolated at high speed.

In addition, in an embodiment of the present invention, the second point group is, of preset grid points on the surface parametric space, those grid points that are included in the calculated convex hull.

A program for generating an error image according to the present invention in which an arithmetic processing unit is inputted with a measurement points obtained by measuring a measured surface of a measurement object by a measuring instrument and free-form surface data which is design data of the measurement object, and in which the arithmetic processing unit calculates error data between the measurement points and the free-form surface data and, corresponding the error data to the measurement points, outputs the error data to an output device, causes the arithmetic processing unit to execute the steps of: calculating a point group on a surface parametric space of the free-form surface data corresponding to the measurement points, as a first point group; calculating error data between each of measurement points and design points on the free-form surface data corresponding to the measurement points; triangulating the first point group to generate first triangular facets and calculate a convex hull of the first point group; setting a second point group distributed in the calculated convex hull on the surface parametric space; obtaining error data of each of points of the second point group by interpolation calculation from error data corresponding to the first point group which is a vertex of the first triangular facets in which each of the respective points of the second point group is included; re-triangulating a point group including the first point group and the second point group to generate second triangular facets; and outputting to the output device the second triangular facets and error data of a vertex of the second triangular facets.

First Embodiment

Configuration

Next, a first embodiment of the present invention is described in detail with reference to the drawings.

FIG. 1 is a block diagram showing an example of a configuration of a system for realizing a method for generating an error image according to the present embodiment. A measurement points (x, y, z) obtained by randomly measuring or scan measuring a measured surface (free-form surface) of a workpiece 2 by a three-dimensional measuring instrument 1 is inputted to a computer 20 which is an arithmetic processing unit. Note that the measurement points (x, y, z) may be obtained from another profile measuring instrument other than the three-dimensional measuring instrument 1 or may be a measurement points (x, y, z) read from a memory device storing measurement-completed data.

The computer 20 is also inputted with free-form surface data (design data) outputted from a CAD system 3 or a memory device 11. The free-form surface data is expressed by a matrix [xij], [yij], [zij] of, for example, Bezier control points, NURBS (Non-Uniform Rational B-Spline) control points, or the like.

The computer 20 realizes the following various functions by execution of a program for generating an error image stored in the memory device 11.

That is, a first point group/error calculating unit 4 calculates a point group on a surface parametric space (u, v) of the free-form surface data corresponding to the measurement points (x, y, z) outputted from the three-dimensional measuring instrument 1, as a first point group (u, v), and calculates error data (u, v, e) between each of measurement points and design values. The error data (u, v, e) includes measurement point position (u, v) on the surface parametric space of the free-form surface data and error data a at that position.

A first triangulating unit 5 triangulates the first point group (u, v) outputted from the first point group/error calculating unit 4, and, in addition, generates first triangular facets data and generates convex hull data, that is, data of an outer polygon, of the first point group (u, v), on the surface parametric space (u, v). Note that corresponding to each vertex (u1, v1) (u2, v2), (u3, v3) of the first triangular facets data are error data (u1, v1, e1), error data (u2, v2, e2), and error data (u3, v3, e3).

A grid point generating unit 6 generates grid points (u, v) in the surface parametric space, at preset intervals, and outputs the grid points (u, v). A second point group generating/error interpolating unit 7 selects, from among the grid points (u, v) outputted from the grid point generating unit 6, that grid points (u, v) included in the convex hull obtained by the first triangulating unit 5, and outputs that selected grid points of the grid points (u, v) as a second point group (u, v). In addition, the second point group generating/error interpolating unit 7 judges, from the error data (u, v, e) outputted from the first point group/error calculating unit 4 and the first triangular facets data triangulated by the first triangulating unit 5, in which triangle of the first triangular facets each of second points of the second point group (u, v) is included, and performs interpolation processing using the error data (u, v, e) of a vertex of the first triangular facets including that point, to calculate the error data (u, v, e) of each of the points of the second point group.

A second triangulating unit 8 performs re-triangulates a point group including the first point group and the second point group to generate second triangular facets data more detailed than the first triangular facets data. A shape of the three-dimensional image finally generated is determined from this second triangular facets data and error data of each of vertices of this second triangular facets data.

A three-dimensional image generating unit 9 generates a three-dimensional image using the free-form surface data outputted from the CAD system 3 or the memory device 11 and the second triangular facets data outputted from the second triangulating unit 8. The three-dimensional image generated herein includes an error image (error map) having a shape of the free-form surface changed according to the error data (u, v, e) of each of the vertices of the second triangular facets data outputted from the second triangulating unit 8. Note that since the free-form surface data and the error image are independent, it is also possible to change the shape of the error image on the free-form surface more strongly to emphasize the error e, to output only error data on a surface parametric plane, and so on. Furthermore, the error image can also be generated by expressing intensity of error by colors, arrows, and the like, rather than by changing the shape of the free-form surface. An output device 10 displays and outputs image data outputted from the three-dimensional image generating unit 9. A display, a printer, or the like, may be applied as the output device 10.

[Operation]

Figure 2:
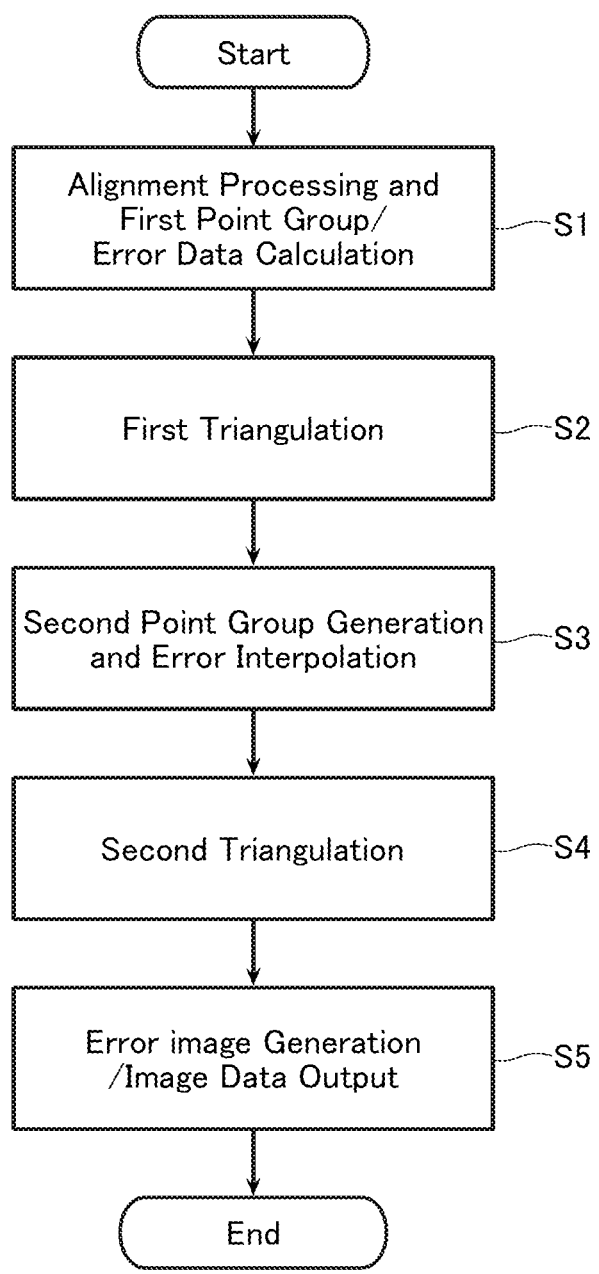
FIG. 2 is a flowchart showing content of the method for generating an error image in the same embodiment.

FIG. 2 is a flowchart showing processing content of the method for generating an error image according to the present embodiment, and FIGS. 3-10 are views for explaining content of a method for generating a three-dimensional image according to the present embodiment. The method for generating an error image according to the present embodiment is described below with reference to FIGS. 2-10.

First, registration is performed to align the measurement points (x, y, z) and the free-form surface data, the measurement points (x, y, z) is converted to the first point group on the surface parametric space (u, v), and the error data (u, v, e) at each of the points is calculated (S1).

Various kinds of methods, for example, best-fit calculation and the like are applicable as the registration. That is, when a Bezier curve is used in generation of the free-form surface, the free-form surface data outputted from the CAD system 3 is defined by, for example, a matrix [xij], [yij], [zij] of (n+1)× (m+1) control points, and a conversion equation to a three-dimensional space is as in the following Expression 1.

$$x(u, v) = \sum_{i=0}^{n} \sum_{j=0}^{m} x_{ij} B_i^n(u) B_j^m(v) \qquad \text{[Expression 1]}$$

-continued $$y(u, v) = \sum_{i=0}^{n} \sum_{j=0}^{m} y_{ij} B_i^n(u) B_j^m(v)$$

$$z(u, v) = \sum_{i=0}^{n} \sum_{j=0}^{m} z_{ij} B_i^n(u) B_j^m(v)$$

$$B_i^n(u) = \binom{n}{i} u^i (1-u)^{n-i}$$

$$B_j^m(v) = \binom{m}{j} v^j (1-v)^{m-j}$$

Figure 3:
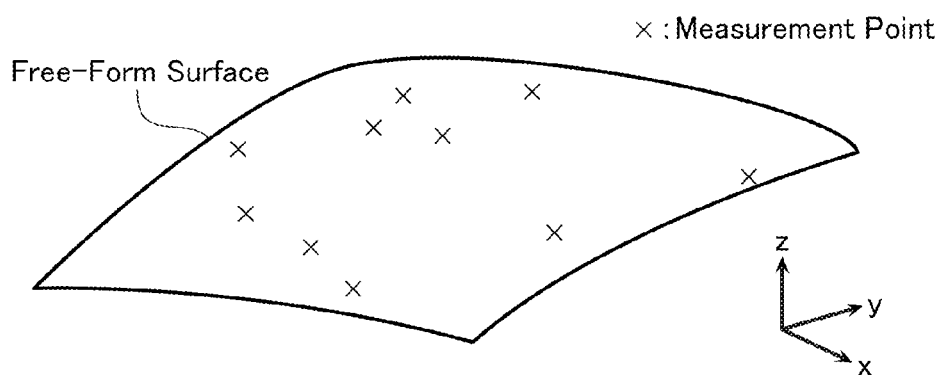
FIG. 3 is a view for explaining processing content of step S1 in the method for generating an error image in the same embodiment.

From a point group on the free-form surface defined as above, that point on the free-form surface having a shortest distance to each of measurement points is searched for, and a motion matrix including a misalignment amount and a rotational amount between the measurement point and the point on the free-form surface is calculated. This results in the free-form surface being moved. As shown in FIG. 3, executing this operation recursively causes a measurement points shown by x marks to be disposed along the free-form surface.

Figure 4:
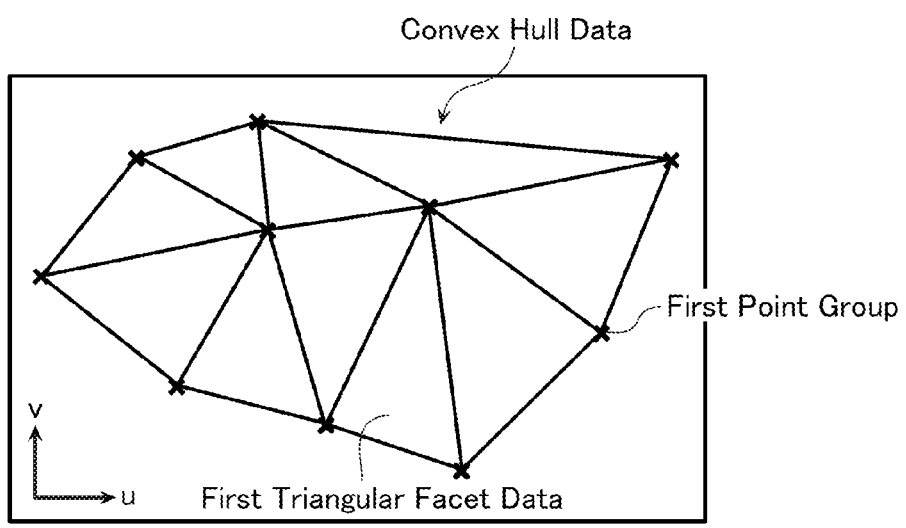
FIG. 4 is a view for explaining processing content of step S2 in the method for generating an error image in the same embodiment.

When a position of the free-form surface data (design position) corresponding to the measurement points (x, y, z) is calculated, next, a position (u, v) on the surface parametric space corresponding to the measurement points (x, y, z) is calculated by a function in Mathematical Expression 1. This results in the first point group data (u, v) corresponding to the measurement points on the surface parametric space being obtained, as shown in FIG. 4. Additionally at this time, a distance between each of the measurement points and design points on the free-form surface is obtained as an error e, to become the error data (u, v, e) corresponded respectively to the first point group data (u, v).

Then, as shown in FIG. 4, a first triangulation in the surface parametric space is executed on the generated first point group data (u, v) (S2). A method such as Delaunay triangulation is applicable as a method of the first triangulation. As a result of Delaunay triangulation, first triangular facets data (u1-u3, v1-v3, e1-e3) is generated, and convex hull data which is data of an outer polygon that includes the first point group data (u, v) inside is generated.

Figure 5:
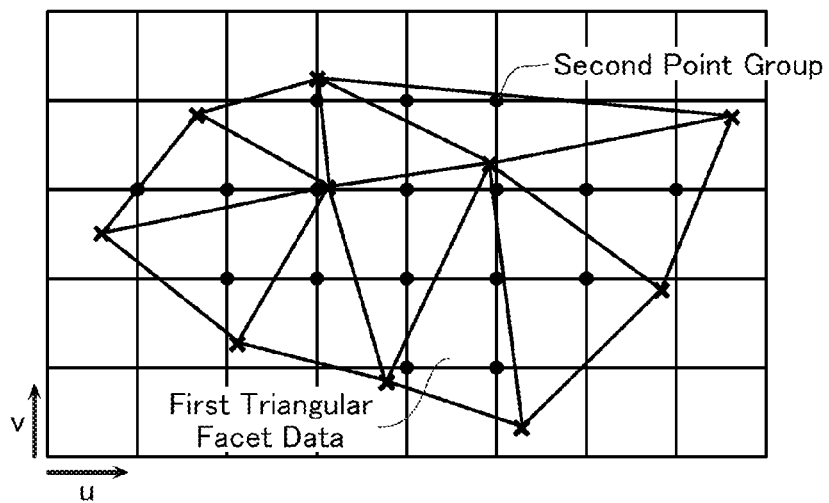
FIG. 5 is a view for explaining processing content of step S3 in the method for generating an error image in the same embodiment.

Next, as shown in FIG. 5, grid points are generated in the surface parametric space (u, v) at a certain interval in u and v directions, and grid points (u, v) included in the convex hull data calculated in step S2 is selected as the second point group data (u, v). The second point group data is contained within any one of the first triangular facets generated from the first point group data. Therefore, error data (u, v, e) of each of the points of the second point group is calculated by interpolation processing from error data (u, v, e) of each of the vertices of the first triangular facets in which the second point group is included (S3). The second point group (u, v), along with the first point group data (u, v), later becomes a vertex of a triangular polygon configuring the three-dimensional image. Therefore, the more densely packed the grid size is made, the more highly precise the generated three-dimensional image becomes. Note that various kinds of methods, such as a center of gravity coordinates method, a Bernstein polynomial and surface equation method, and so on are applicable as the method of interpolation processing, but the present embodiment shows an example where linear interpolation by center of gravity coordinates is used.

Figure 6:
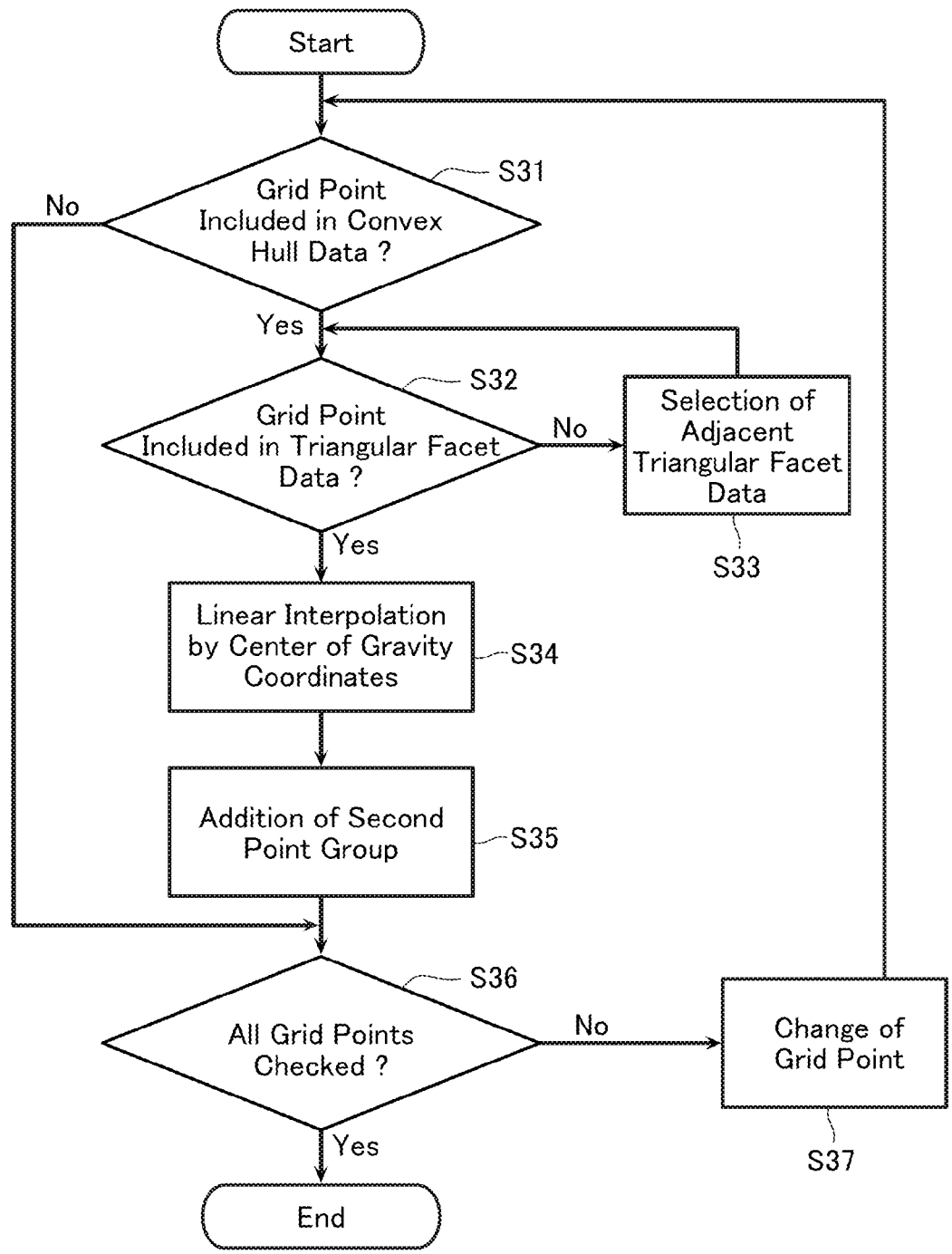
FIG. 6 is a flowchart for explaining processing content of step S3 in the method for generating an error image in the same embodiment.

FIG. 6 shows an example having an even more detailed content of processing in step S3. First, it is judged whether a selected grid point (u, v) is included inside the convex hull data or not (S31). For example, if topology of a triangular patch is expressed using a Winged-Edge structure, then tracking this Winged-Edge structure allows the first triangular facet data including the grid point to be searched for at high speed. A method of this internal judgment is indicated below.

Figure 7:
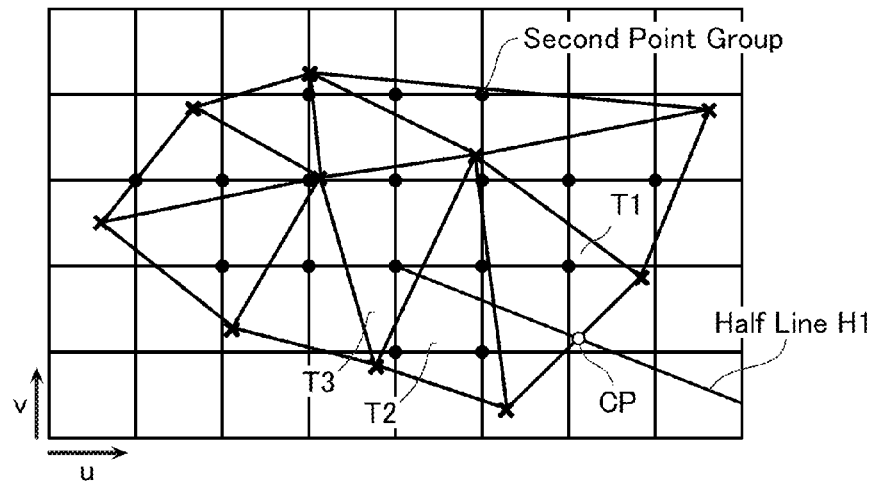
FIG. 7 is a view for explaining a method of internal judgment in the same embodiment.

That is, as shown in FIG. 7, a half line H1 is set from the grid point, and a number of intersection points CP of the half line H1 and the convex hull data is obtained. If the number of intersection points CP obtained is an even number, the grid point is judged to be outside, and if the number of intersection points CP obtained is an odd number as in FIG. 7, the grid point is judged to be inside (S31).

When a grid point is judged to be outside the convex hull data, that grid point is not used in the interpolation processing (S31).

When a grid point is judged to be inside the convex hull data, the first triangular facets data including that grid point is obtained (S32 and S33). That is, first, an intersection point CP of the half line H1 from the grid point and a convex hull boundary area is obtained. Next, the Winged edge structure of the triangular patch from this intersection point CP is tracked to search for the first triangular facets data including the grid point. In the example of FIG. 7, first triangular facet data T3 is searched for by tracking from first triangular facet data T1 including the intersection point C2 in its edge, in an order T1→T2→T3.

Although such a processing requires two times of calculations on the boundary of the convex hull and a calculation time for this occupies a large proportion of a total time, the calculation time is significantly reduced compared to that of a calculation on all triangles, hence the processing allows appropriate triangle data to be found quickly.

However, instead of performing such two times of independent triangulations, it is possible to adopt a configuration having a tree structure where, subsequent to the first triangulation, every time a grid point is added, a triangulation is performed on a triangle including the added grid point, whereby triangulation information changes every time a grid point is added. In this case, a search for the triangle including the grid point can be performed at high-speed using the tree structure at that time point.

Next, linear interpolation by center of gravity coordinates is performed to calculate the error e (S34), and error data (u, v, e) of the second point group is added (S35). The above processing is performed for all of the grid points (S36 and S37). Note that the interval between grid points (u, v) is set appropriately by a user.

Figure 8:
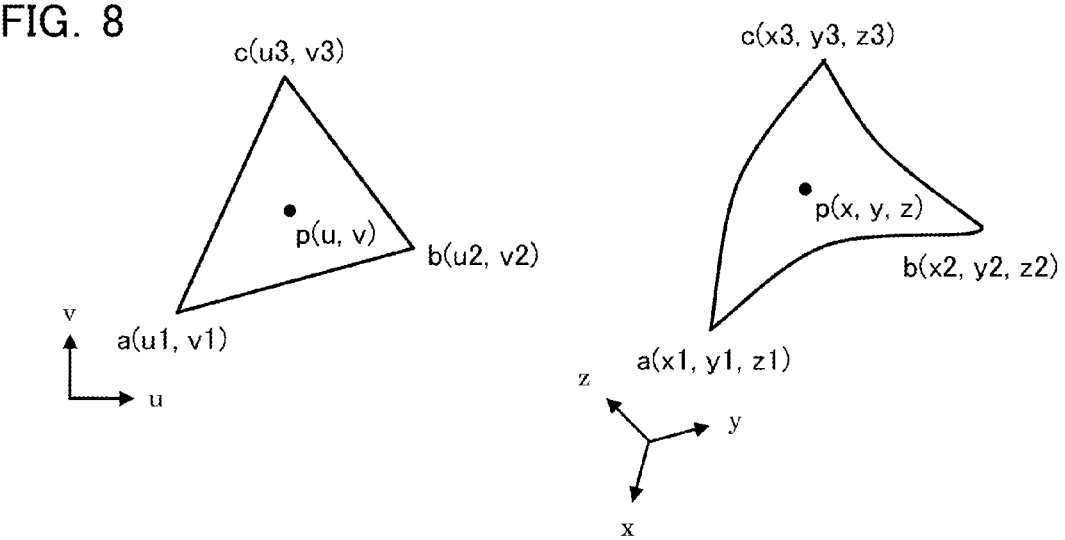
FIG. 8 is a view for explaining a method of linear interpolation in center of gravity coordinates.

The linear interpolation by center of gravity coordinates in step S34 is described with reference to FIG. 8. Vertices of a triangle including a grid point p (u, v) are assumed to be point a (u1, v1), point b (u2, v2), and point c (u3, v3), respectively, and error of point a, error of point b, and error of point c are assumed to be e1, e2, and e3, respectively. At this time, error e of the grid point p (u, v) is given by the following equation.

$$e = Ue_1 + Ve_2 + We_3 \quad \text{[Expression 2]}$$

However, U, V, and W are given by the following expressions.

$$U = \frac{A(p, b, c)}{A(a, b, c)}, V = \frac{A(a, p, c)}{A(a, b, c)}, W = \frac{A(a, b, p)}{A(a, b, c)} \quad \text{[Expression 3]}$$

$$A(a, b, c) = \frac{1}{2} \begin{vmatrix} 1 & 1 & 1 \\ u1 & u2 & u3 \\ v1 & v2 & v3 \end{vmatrix}$$

Figure 9:
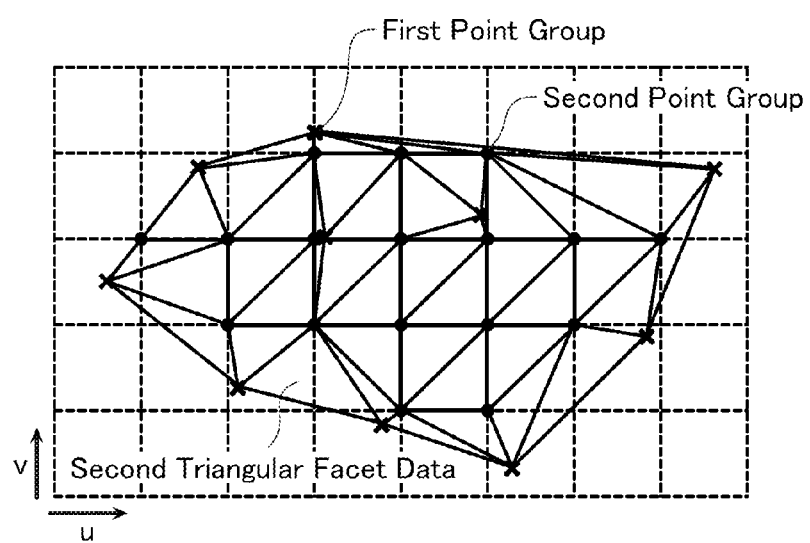
FIG. 9 is a view for explaining processing content of step S4 in the method for generating an error image in the same embodiment.

Next, a second triangulation is performed on the first point group data (u, v) and the second point group data (u, v), to generate second triangular facets data (u1-u3, v1-v3, e1-e3) such as that shown in FIG. 9 (S34). Specifically, a method such as that of Delaunay triangulation is applicable similarly to in step S2. Note that since Delaunay triangulation in step S4 is performed on the first point group data (u, v) and the second point group data (u, v), second triangular facets data (u1-u3, v1-v3, e1-e3) more detailed than that of the first Delaunay triangulation in step S2 is generated. Next, a three-dimensional image including an error image (error map) is generated using the generated triangle data (u1-u3, v1-v3, e1-e3), the error data (u, v, e), and the free-form surface data, and this three-dimensional image is outputted by the output device (S5).

Figure 10:
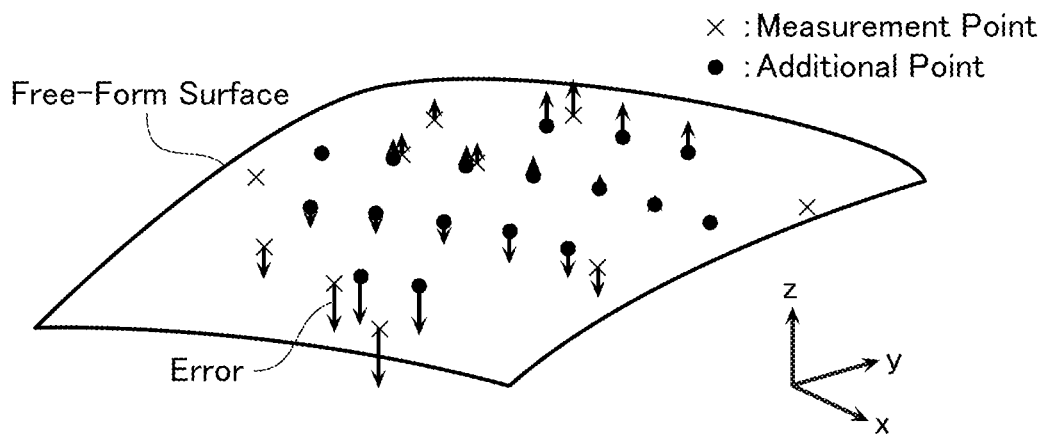
FIG. 10 is a view for explaining processing content of the method for generating an error image in the same embodiment.

FIG. 10 is an example of the three-dimensional image including the error image (error map) displayed. As is clear from this example, this embodiment makes it possible to generate a natural error image by interpolation processing from a small number of measurement points.

As is clear from the above, the present embodiment obtains first triangular facets by a first triangulation processing from first point group data corresponding to a measurement points, adds a second point group to inside these first triangular facets and obtains error data in each of second points in the second point group by interpolation computation, hence allows an overall distribution of error to be grasped and more useful measurement information to be provided.

In addition, there is an advantage that since a second triangulation is performed after adding the second point group to the first point group, then, even if the first triangulation is rough and does not reflect actual shape, the second triangulation is performed independently of the first triangulation, hence the first unnatural triangulation result is not carried over.

Note that the following may also be considered as an alternative method of triangulation to Delaunay triangulation, namely, triangulating sides of generated triangle data (u1-u3, v1-v3, e1-e3) and recursively making the triangle smaller until an appropriate size is reached. However, such a method results in triangulation being performed many times, hence calculation time increases significantly. In this respect, the above-mentioned embodiment, since it performs a final overall triangulation after the second point group is obtained, enables high precision and high speed triangulation processing.

Figure 11:
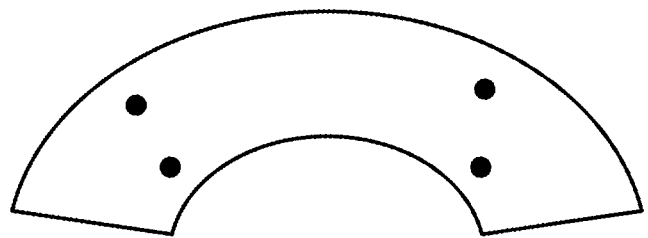
FIG. 11 is a view showing an appearance of a method for generating a three-dimensional image according to a comparative example.
Figure 12:
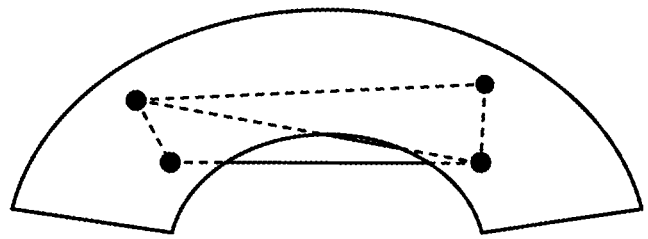
FIG. 12 is a view showing an appearance of a method for generating a three-dimensional image according to a comparative example.

Moreover, there is a problem that, in the case that there are few measurement points and the fellow vertices of the triangle polygon are separated from each other, if interpolation processing is simply performed, the triangle polygon partially protrudes from the free-form surface, as in the comparative example shown in FIGS. 11 and 12. In this respect, the present embodiment, by disposing an additional point group in more detail inside the convex hull of the measurement points on the surface parametric space, enables an interpolation closer to the actual shape to be performed.

Note that in the present embodiment, the second point group data is selected from grid points included in the convex hull of the first point group data. However, second point group data, provided it is a point group included in the convex hull and is distributed uniformly, need not be grid points. For example, it is also possible to adopt a configuration where the second point group is set randomly or where intersection points of the grid and the convex hull are also included in the second point group.

What is claimed is:

1. A method for generating an image indicating errors comprising:
   receiving measurement points obtained by measuring a measured surface of a measurement object by a three-dimensional measuring instrument in an arithmetic processing unit;
   receiving free-form surface data which is design data of the measurement object in the arithmetic processing unit;
   calculating a point group on a surface parametric space of the free-form surface data corresponding to the measurement points, as a first point group;
   calculating error data between each of measurement points and design points on the free-form surface data corresponding to the measurement points;
   triangulating the first point group to generate first triangular facets and calculate a convex hull of the first point group;
   setting a second point group distributed in the calculated convex hull on the surface parametric space;
   obtaining error data of each of points of the second point group by interpolation calculation from error data corresponding to the first point group which is a vertex of the first triangular facets in which each of the respective points of the second point group is included;
   re-triangulating a point group including the first point group and the second point group to generate second triangular facets; and
   outputting to an output device the second triangular facets and error data of a vertex of the second triangular facets in order to generate the image indicating errors based on the second triangular facets and error data of the vertex of the second triangular facets.

2. The method for generating an image indicating errors according to claim 1, wherein
   the second point group is, of preset grid points on the surface parametric space, those grid points that are included in the calculated convex hull.

3. The method for generating an image indicating errors according to claim 2, wherein the setting the second point group comprises:
   setting a half line from the grid point;
   obtaining a number of intersection points between the half line and the convex hull of the first point group;
   when the number of intersection points between the half line and the convex hull of the first point group is an even number, judging that the grid point is outside the convex hull of the first point group; and
   when the number of intersection points between the half line and the convex hull of the first point group is an odd number, judging that the grid point is inside the convex hull of the first point group.

4. The method for generating an image indicating errors according to claim 3, wherein the setting the second point group further comprising:
   obtaining an intersection point between the half line from the grid point and a convex hull boundary side of the first point group after the judging that the grid point is inside the convex hull of the first point group; and
   tracking a winged edge structure of the first triangular facets from the intersection point between the half line and the convex hull boundary side of the first point group to search for the first triangular facet including the grid point.

5. The method for generating an image indicating errors according to claim 1, wherein
the second point group is, of randomly distributed points on the surface parametric space, those points that are included in the calculated convex hull.

6. The method for generating an image indicating errors according to claim 1, wherein the calculating the first point group comprises:
searching for, from a point group on the free-form surface, that point on the free-form surface having a shortest distance to each of measurement points of the measurement points, and calculating a motion matrix between the measurement point and the point on the free-form surface; and
moving the free-form surface with respect to the measurement points based on the motion matrix.

7. A non-transitory computer readable medium containing computer instructions stored therein for causing a computer processor to perform:
receiving measurement points obtained by measuring a measured surface of a measurement object by a three-dimensional measuring instrument in an arithmetic processing unit;
receiving free-form surface data which is design data of the measurement object in the arithmetic processing unit;
calculating a point group on a surface parametric space of the free-form surface data corresponding to the measurement points, as a first point group;
calculating error data between each of measurement points and design points on the free-form surface data corresponding to the measurement points;
triangulating the first point group to generate first triangular facets and calculate a convex hull of the first point group;
setting a second point group distributed in the calculated convex hull on the surface parametric space;
obtaining error data of each of points of the second point group by interpolation calculation from error data corresponding to the first point group which is a vertex of the first triangular facets in which each of the respective points of the second point group is included;
re-triangulating a point group including the first point group and the second point group to generate second triangular facets; and
outputting to an output device the second triangular facets and error data of a vertex of the second triangular facets in order to generate an image indicating errors based on the second triangular facets and error data of the vertex of the second triangular facets.

8. The non-transitory computer readable medium according to claim 7, wherein
the second point group is, of preset grid points on the surface parametric space, those grid points that are included in the calculated convex hull.

9. The non-transitory computer readable medium according to claim 8, wherein the step of setting the second point group comprises the steps of:
setting a half line from the grid point;
obtaining a number of intersection points between the half line and the convex hull of the first point group;
when the number of intersection points between the half line and the convex hull of the first point group is an even number, judging that the grid point is outside the convex hull of the first point group; and
when the number of intersection points between the half line and the convex hull of the first point group is an odd number, judging that the grid point is inside the convex hull of the first point group.

10. The non-transitory computer readable medium according to claim 9, wherein the step of setting the second point group further comprises the steps of:
obtaining an intersection point between the half line from the grid point and a convex hull boundary side of the first point group after the step of judging that the grid point is inside the convex hull of the first point group; and
tracking a winged edge structure of the first triangular facets from the intersection point between the half line and the convex hull boundary side of the first point group to search for the first triangular facet including the grid point.

11. The non-transitory computer readable medium according to claim 7, wherein
the second point group is, of randomly distributed points on the surface parametric space, those points that are included in the calculated convex hull.

12. The non-transitory computer readable medium according to claim 7, wherein the step of calculating the first point group comprises the steps of:
searching for, from a point group on the free-form surface, that point on the free-form surface having a shortest distance to each of measurement points, and calculating a motion matrix between the measurement point and the point on the free-form surface; and
moving the free-form surface with respect to the measurement points based on the motion matrix.

13. A non-transitory computer readable medium containing computer instructions stored therein for causing a computer processor to perform:
receiving measurement points obtained by measuring a measured surface of a measurement object by a three-dimensional measuring instrument in an arithmetic processing unit;
receiving free-form surface data which is design data of the measurement object in the arithmetic processing unit;
calculating a point group on a surface parametric space of the free-form surface data corresponding to the measurement points, as a first point group;
calculating error data between each of measurement points and design points on the free-form surface data corresponding to the measurement points;
triangulating the first point group to generate first triangular facets and calculate a convex hull of the first point group;
setting a second point group distributed in the calculated convex hull on the surface parametric space;
obtaining error data of each of points of the second point group by interpolation calculation from error data corresponding to the first point group which is a vertex of the first triangular facets in which each of the respective points of the second point group is included; and
outputting the error data to an output device in order to generate an image indicating errors based on the error data.

14. The non-transitory computer readable medium according to claim 13, causing the arithmetic processing unit to further execute the steps of:
re-triangulating a point group including the first point group and the second point group to generate second triangular facets; and
outputting to the output device the second triangular facets and error data of a vertex of the second triangular facets.

15. The non-transitory computer readable medium according to claim 13, wherein the step of the setting the second point group comprising the steps of:
  triangulating the first triangular facets including second points configuring the second point group in accordance with addition of the second point group to the calculated convex hull to generate second triangular facets; and
  outputting to the output device the second triangular facets and error data of a vertex of the second triangular facets.

16. The non-transitory computer readable medium according to claim 13, wherein
  the second point group is, of preset grid points on the surface parametric space, those grid points that are included in the calculated convex hull.

17. The non-transitory computer readable medium according to claim 16, wherein the step of setting the second point group comprises the steps of:
  setting a half line from the grid point;
  obtaining a number of intersection points between the half line and the convex hull of the first point group;
  when the number of intersection points between the half line and the convex hull of the first point group is an even number, judging that the grid point is outside the convex hull of the first point group; and
  when the number of intersection points between the half line and the convex hull of the first point group is an odd number, judging that the grid point is inside the convex hull of the first point group.

18. The non-transitory computer readable medium according to claim 17, wherein the step of setting the second point group further comprising the steps of:
  obtaining an intersection point between the half line from the grid point and a convex hull boundary side of the first point group after the step of judging that the grid point is inside the convex hull of the first point group; and
  tracking a winged edge structure of the first triangular facets from the intersection point between the half line and the convex hull boundary side of the first point group to search for the first triangular facet including the grid point.

19. The non-transitory computer readable medium according to claim 13, wherein
  the second point group is, of randomly distributed points on the surface parametric space, those points that are included in the calculated convex hull.

20. The non-transitory computer readable medium according to claim 13, wherein the step of calculating the first point group comprises the steps of:
  searching for, from a point group on the free-form surface, that point on the free-form surface having a shortest distance to each of measurement points, and calculating a motion matrix between the measurement point and the point on the free-form surface; and
  moving the free-form surface with respect to the measurement points based on the motion matrix.

* * * * *